United States Patent [19]
Mitra et al.

[11] Patent Number: 5,956,649
[45] Date of Patent: Sep. 21, 1999

[54] METHOD AND APPARATUS FOR POWER CONTROL IN WIRELESS NETWORKS

[75] Inventors: Debasis Mitra, Summit; John A. Morrison, New Providence, both of N.J.

[73] Assignee: Lucent Technologies Inc., Murray Hill, N.J.

[21] Appl. No.: 09/182,906

[22] Filed: Oct. 29, 1998

Related U.S. Application Data

[63] Continuation of application No. 08/934,912, Sep. 22, 1997, abandoned, which is a continuation of application No. 08/429,260, Apr. 25, 1995, abandoned.

[51] Int. Cl.$^6$ ............................................... H04B 17/00
[52] U.S. Cl. ........................... 455/522; 455/63; 455/67.3
[58] Field of Search .................... 455/517, 524, 455/522, 63, 67.3, 422, 69

[56] References Cited

U.S. PATENT DOCUMENTS 5,265,119 11/1993 Gilhousen et al. ...................... 455/69

OTHER PUBLICATIONS

Ariyavistakul et al., "Signal and Interference Statistics of a CDMA System with Feedback Power Control", GLOBECOM, pp. 1490–1495, Jan. 1999.

Prasad et al. "Comments on Analysis for Spectrum Efficiency in Single Cell Trunked and Cellular Mobile Radio", IEEE, pp. 220–222, Jan. 1989.

*Primary Examiner*—Reinhard J. Eisenzopf
*Assistant Examiner*—Marsha D. Banks-Harold

[57] ABSTRACT

A method and apparatus use a set of parameters characterizing an interference signal at a base unit for determining power levels for signals transmitted from a communications device to the base unit. The set of parameters comprises second or higher order statistics characterizing the interference signal, and the parameters are used to determine a desired power level for signals received at the base unit. The desired power level is communicated to a communications device via a pilot signal transmitted by the base unit at a predetermined level. The predetermined level and the power of the received pilot signal are used to compute a path gain between the base unit and communications device. The path gain and desired power level are then used to determine the power level of signals transmitted from the communications device to the base unit.

55 Claims, 3 Drawing Sheets

METHOD AND APPARATUS FOR POWER CONTROL IN WIRELESS NETWORKS

This is a continuation of application Ser. No. 08/934,912 filed on Sep. 22, 1997 now abandoned which is in turn a continuation of Ser. No. 08/429,260 filed on Apr. 25, 1995 now abandoned.

TECHNICAL FIELD

The invention relates to the area of wireless communications.

BACKGROUND OF THE INVENTION

Wireless communications networks, and particularly cellular communications networks, have experienced tremendous growth in recent years. In a cellular communications network a geographic service area is divided into a number of cells. Each cell has a cell site (also called a base station) connected to a telephone network. The cell site establishes a wireless link with communications devices (hereinafter "user devices" or "devices") operated by network users within the cell who wish to send and receive information (e.g. text, audio, speech, video, etc.) via the public telephone network.

Current, first-generation cellular networks are based on analog FM technology in which a radio channel serves as the wireless link between a base station and a communications device. In these networks, interference between communications from different devices operating on the same channel is kept to acceptable levels by permitting each cell in the network to use only a subset of the radio channels available to the cellular network with the subset of radio channels for adjacent cells having no radio channels in common. System capacity is maintained through reuse of radio channels in non-adjacent cells. System quality is maintained by reusing frequencies only in cells that are far enough apart so that any interference is below acceptable levels. First generation cellular networks, however, are facing an increased demand for higher capacity to support a growing number of users and an increased demand for higher quality links to support data communications requiring low error rates.

With the objective of satisfying the demands for increased capacity and for higher quality links, second-generation cellular schemes, based on digital radio technology and advanced networking principles, are now being developed. These second-generation schemes will utilize spread spectrum multiple access techniques. Spread spectrum techniques are useful for facilitating communications when a large number of user devices wish to access a cellular network and when the transmissions in the network will be subject to interference. See, K. S. Gilhousen, et al., "On the Capacity of a Cellular CDMA System," IEEE *Trans. Veh. Tech.,* Vol. 40, No. 2, pp. 303–312, May 1991; A. M. Viterbi and A. J. Viterbi, "Erlang Capacity of a Power Controlled CDMA System," *J. Sel. Areas Comm.,* Vol. 11, No. 6, pp. 892–900, August 1993. By "spread spectrum" it is meant that each user generates a wideband signal (e.g. by code division multiple access or by very fast frequency hopping) which is treated as noise or interference by other users in the network. The design of spread spectrum cellular networks is challenging because the network must be reliable, with cellular networks typically assuring each user of a quality of service level, e.g. a guaranteed minimum bandwidth (in bits per second) and a guaranteed maximum bit error rate. The quality of service is typically related to the carrier-to-interference ratio (CIR), i.e. the ratio of the power level of a desired signal received at a given location to the power level of all other received signals at the given location.

Maintaining sufficient transmission quality on the wireless links is a critical factor in maintaining cellular system capacity and quality of service requirements. If for example, a signal transmitted by a communications device arrives at a base station at a power level that is too low, the bit error rate may be too high to allow high quality communications. If however, a signal transmitted by a communications device arrives at the base station at a power level that is too high, this high power level interferes with and degrades signals transmitted by other users. System capacity, therefore, can be increased if the transmitted power of each device is controlled such that the transmitted signal arrives at the base station at the minimum power level which satisfies the quality of service requirements.

The control of power levels of signals transmitted from devices to base stations may be either centralized or distributed. In centralized power control techniques, a single controller determines the power level for each device in the cell, and communicates that level to each device. Centralized control is advantageous in that a desired CIR level can be achieved immediately since the centralized controller has information about devices in contact with the base station (e.g. about which devices will terminate or initiate communications in a time interval). Distributed control, in contrast, uses an iterative approach in which power levels are adjusted based on feedback from the devices. Centralized control, however, involves the added infrastructure of a central control mechanism thereby resulting in added network vulnerability due to the single point of control.

Recent work has therefore emphasized distributed, or local, control. In a distributed power control network, the power level of each device is guided, using local measurements only, so that eventually all base stations meet any specified CIR requirements. Such power control methods typically adjust the power levels in communications devices based on a determination of the mean (which is a first order statistic) of the interference level at a base station. See, e.g., J. Zander, "Distributed Cochannel Interference Control in Cellular Radio Systems," IEEE *Trans. Vehic. Tech.,* Vol. 41(3), pp. 305–311, August 1992; G. J. Foschini and Z. Miljanic, "A Simple Distributed Autonomous Power Control Algorithm and its Convergence," IEEE *Trans. Vehic. Tech,* Vol. 42(4), pp. 641–646, November 1993; and S. V. Hanly, "Capacity in a two cell spread spectrum network," 30*th Annual Conference on Communication, Control and Computing,* Allerton House, Monticello, Ill., pp. 426–435, 1992.

However, these methods of power control do not operate well in systems where there is randomness or variations in the received power level at the base station, such as in cellular networks where variations in the power received at a base station may be caused by a variety of factors, such as by multipath fading (caused by changes in the characteristics of the wireless link) or by communications devices transmitting information in bursts (as for example by a user transmitting information by speaking and by then remaining silent for a period of time before speaking again). Thus, there is a need for an improved method and apparatus to determine power levels for signals transmitted by communications devices in wireless networks.

SUMMARY OF THE INVENTION

In accordance with the present invention it is recognized that a set of parameters comprising second or higher order statistics can be used to characterize variations in a signal received at a base unit and that such parameters can then be used to control transmitted power levels for a signal sent by a communications device to the base unit. The set of parameters advantageously includes the variance of an interference signal received at the base unit. Based on the set of parameters, a desired power level for a signal received at a base station from a communications device is determined. The transmitted power level for the signal sent from the communications device is then determined based on the desired power level and on a path gain between the communications device and the base unit. The path gain is determined by measuring, at the communications device, a received power level of a pilot signal transmitted from the base station.

BRIEF DESCRIPTION OF THE DRAWINGS

Other features and advantages of the invention will become apparent from the following detailed description taken together with the drawings in which.

DETAILED DESCRIPTION

Figure 1:
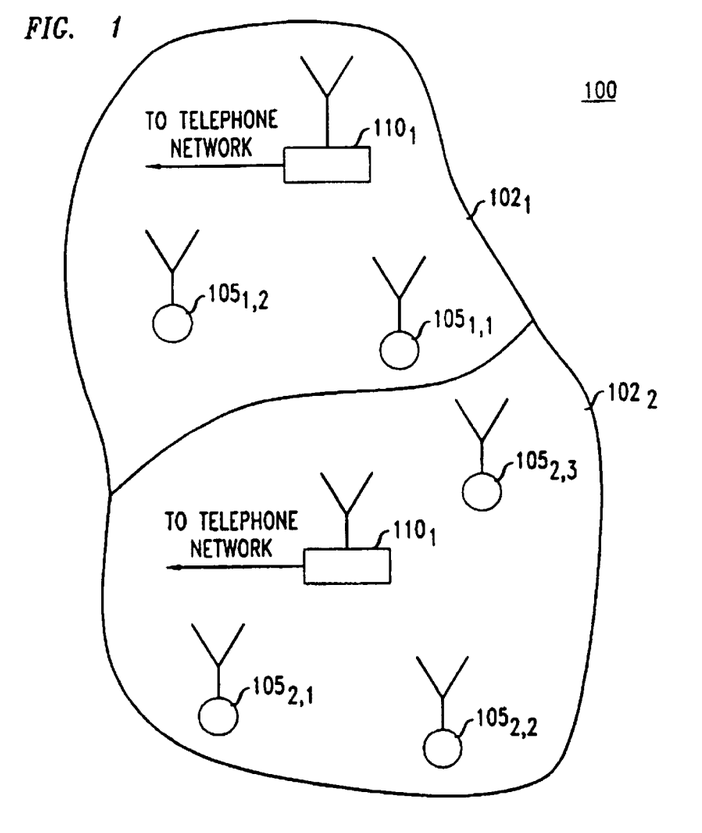
FIG. 1 is a diagram of a cellular communications network.

FIG. 1 illustrates the components of a cellular communications network in which the inventive method and apparatus for power control may be practiced. Cell $102_i$ represents a portion of the geographic area 100 served by the network. Within cell $102_i$ is cell site $110_i$ which is connected to a telephone network. Base station $110_i$ establishes a wireless link with a $k^{th}$ device $105_{ik}$ within cell 102, for transmitting and receiving information (i.e. data representing text, speech, video, etc.). The cellular network advantageously is a spread spectrum multiple access system in which each device uses the full spectrum of available bandwidth, W, measured in Hertz (Hz).

Figure 2:
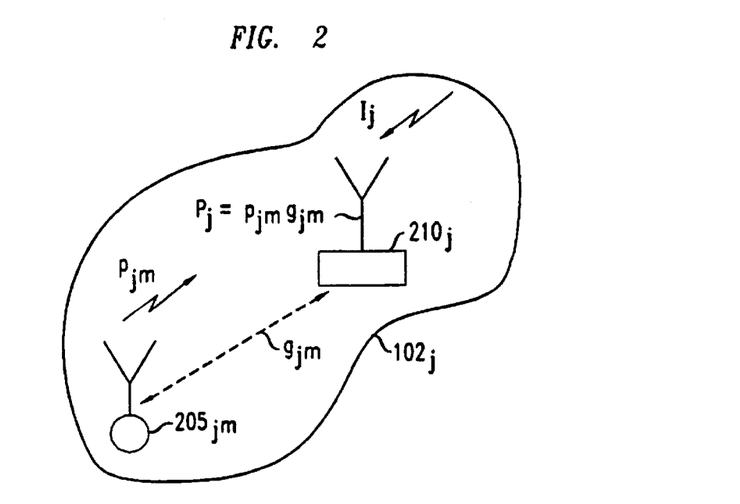
FIG. 2 is a diagram of a single cell in a cellular communications network with one user.

FIG. 2 illustrates single cell $102_j$ in a cellular network which provides a context for terminology used below. The $m^{th}$ device in cell $102_j$ is designated device $205_{jm}$. Device $205_{jm}$ has a performance level or quality of service requirement that is a function of $C_{jm}/I_j$, the carrier to interference ratio (CIR). More specifically, the parameter $C_{jm}$ is the signal power of a signal transmitted by device $205_{jm}$ as received at cell site $210_j$, and $I_j$ is the total power of all signals received at cell site $210_j$. (It will be obvious to those skilled in the art that the method and apparatus described herein can be readily adapted if the interference level I is defined as the power of all signals, except the signal from a particular user, received at a cell site). As shown in more rigorous detail below, $I_j$ is the interference level at cell site $210_j$ due to local receiver noise, signals received at cell site $210_j$ from communications devices located outside cell $102_j$, etc.

Device $205_{jm}$ transmits a signal with power $p_{jm}$ to cell site $210_j$. The path gain to cell site $210_j$ from device $205_{jm}$ is $g_{jm}$, and thus the received power at the cell site is $g_{jm}p_{jm}$. Assume that the received power at cell site $210_j$ from the $m^{th}$ device in cell $102_j$ is given by $P_j$ independently of m, i.e., $P_j \triangleq g_{jm}p_{jm}$.

As noted above, proper regulation of received power levels can increase system capacity and quality. In an embodiment of the invention, $P_j$ is a desired power level received from devices within cell $102_j$. The desired power level is advantageously based on a set of parameters, the set of parameters comprising second or higher order statistics, characterizing the interference signal at cell site $102_j$. By second or higher order statistics, respectively, it is meant, the expected value of a function of a random variable, the function comprising the random variable raised to a power of two or higher. For example, second moments, second central moments and third central moments are second or higher order statistics. Advantageously, the set of parameters comprises the variance (a second order moment) of the interference signal. Thus, if the set of parameters is measured at time n, the desired power level at time (n+1) may be expressed as $$P_j(n+1) = \alpha\left[\bar{I}_j(n) + v_j\sqrt{\bar{V}(n)}\right], \quad (n = 0, 1, \ldots)$$

where $\bar{I}_j(n)$ is the average of the interference signal at cell site $210_j$ at time n, $\bar{V}_j(n)$ is the variance of the interference signal at time n, $\alpha$ is a parameter related to a quality of service requirement, and $v_j$ is a function of a probability measure that the quality of service requirement will be met.

Figure 3:
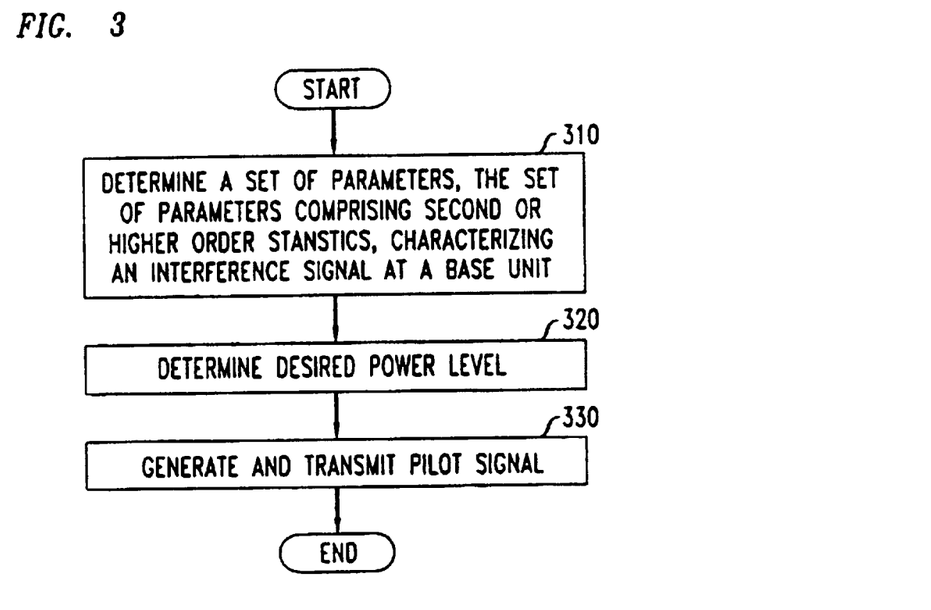
FIG. 3 is a flowchart of a method for generating a pilot signal, the pilot signal comprising information about an interference signal at a base unit.

FIG. 3 illustrates steps in a method in which the desired power level $P_j$ is determined. The steps in the method of FIG. 3 are advantageously performed at a $j^{th}$ cell site in a cellular system. In step 310 the set of parameters characterizing the interference signal, e.g. the mean and the variance, are advantageously determined from measured values of the interference signal. In step 320 the desired power level at the $j^{th}$ cell site $P_j$, is determined using, for example, the expression above. In step 330 a pilot signal is generated and transmitted from the $j^{th}$ cell site, as for example by dedicating a particular radio channel for transmission of the pilot signal. The pilot signal advantageously incorporates information about the desired power level $P_j$.

Figure 4:
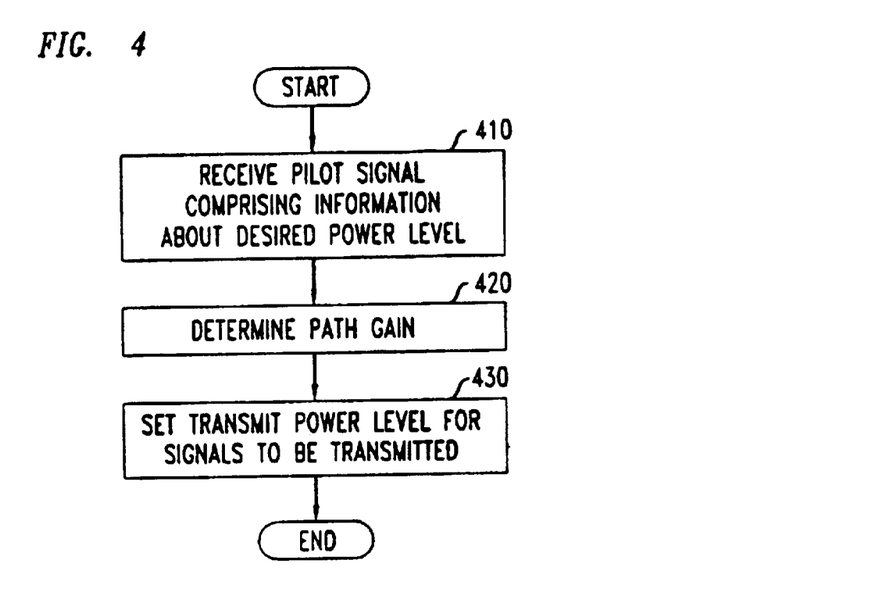
FIG. 4 is a flowchart of a method for determining the power level of a signal transmitted by a communications device.

FIG. 4 illustrates steps in a method in which the power level for signals transmitted from an $m^{th}$ device in communication with the $j^{th}$ cell site can be determine In step 410 the $m^{th}$ device receives a pilot signal, such as the pilot signal generated by the steps in the method illustrated in FIG. 3. The $m^{th}$ device measures the power in the received pilot signal. Next, the path gain $g_{jm}$ between the $m^{th}$ device and the $j^{th}$ cell site is determined in step 420.

Note that the pilot signal may advantageously be used to determine the path gain by dividing the transmit power level of the pilot signal by the measured received power level of the pilot signal at the particular device. For example, the pilot signal may comprise information about the transmit power level at which the pilot signal is transmitted, and the transmit power is determined by extracting the information from the received pilot signal. Alternatively, the transmit power level may be known to users of the system, e.g. the transmit power level may be a quantity that is fixed or that is predetermined according to a schedule, etc. It is assumed that the path gain between the $j^{th}$ cell site and the particular device is the same as the path gain between the particular device and the $j^{th}$ cell site.

Returning to FIG. 4, the power level, $p_{jm}$, for signals transmitted from the $m^{th}$ device to the $j^{th}$ cell site may then be set in step 430. In particular, the transmit power level may advantageously be set according to $p_{jm}=P_j/g_{jm}$.

Figure 5:
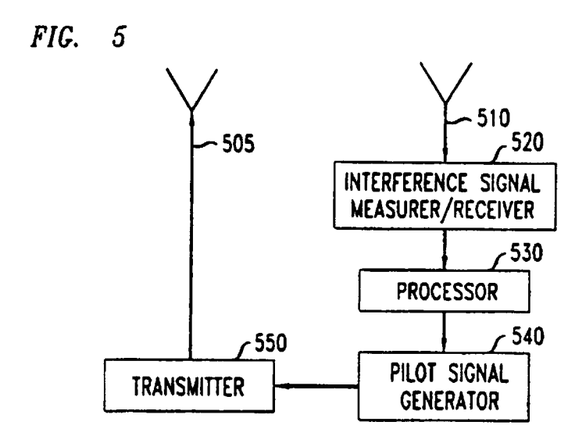
FIG. 5 is a block diagram of an apparatus for generating a pilot signal from a base unit

FIG. 5 illustrates an apparatus which may be used at a $j^{th}$ cell site to implement the steps in FIG. 3. Antenna 510 receives an interference signal $I_j$ which is input to measurer 520 and processor 530 to determine a set of parameters characterizing the interference signal. The set of parameters, which comprises second or higher order moments, is then input to processor 530 to determine the desired power level $P_j$ of received signals at the $j^{th}$ cell site, as for example, according to the expression above. Next, pilot signal generator 540 generates a pilot signal, the pilot signal advantageously comprising information about the desired power level. Pilot signal generator may advantageously transmit the pilot signal at a transmit power level via transmitter 550 and transmitting antenna 505. In one embodiment of the invention, the transmit power level of the pilot signal is known to devices receiving the pilot signal. In another embodiment, information comprising the value of the transmit power level may also be incorporated into the pilot signal.

Figure 6:
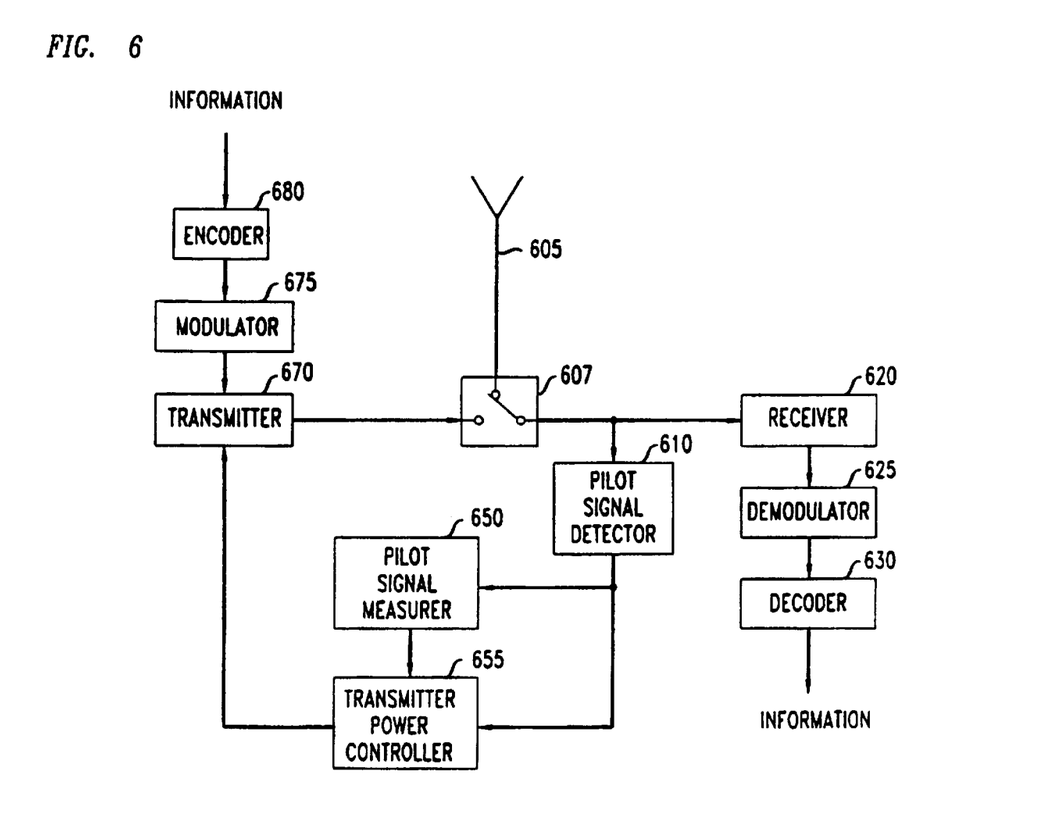
FIG. 6 is a block diagram of an apparatus for determining a transmit power level for a communications device.

FIG. 6 illustrates an apparatus which may be used by an $m^{th}$ device to implement the steps in FIG. 4 to determine a power level for a signal transmitted from the $m^{th}$ device to a $j^{th}$ cell site. The apparatus of FIG. 6 employs a single antenna 605 which may be used, depending on the position of switch 607, for transmitting or receiving signals to or from the $j^{th}$ cell site. When receiving a signal, detector 610 first checks to determine if a pilot signal is received, and if so, detector 610 determines, from information in the pilot signal, the desired power level $P_j$ for the $j^{th}$ cell site.

Receiver 620 will also receive signals arriving at antenna 605. Demodulator 625 will filter out those signal received that are intended for the device using methods well known in the art. See, e.g., John G. Proakis, *Digital Communications,* McGraw-Hill, New York, 1983. Decoder 630 may also be used to process received signals to generate information for a device user where the received signals were encoded (e.g. by error correcting codes).

Returning to block 610, if a pilot signal is received, its power is measured by measurer 650. Transmitter power controller 655 then uses the measured received pilot signal and the transmit power level of the pilot signal to determine a path gain $g_{jm}$ as discussed above. Then, based on $P_j$ and on the determined path gain $g_{jm}$, transmitter power controller 655 controls a power level for a signal transmitted by the device. The signal transmitted by the device comprises information, preferably in digital form, which may be encoded by encoder 680 prior to modulating the information in modulator 675 and prior to transmission by transmitter 670. For example, encoder 680 may encode the information using error correcting codes. Transmitter 670 may also be used to control switch 607 so that switch 607 is connected to detector 610 only when transmitter 670 is not active. Those skilled in the art will recognize that the apparatus of FIG. 6 may also employ separate receive and transmit antennas.

A more rigorous presentation for the method and apparatus for power control in wireless networks is presented below. In particular, the presentation below describes factors considered in generating the above expression for a desired power level.

Recall, a communications device m in cell j transmits at power $p_{jm}$, and the gain to its cell site is $g_{jm}$, so that the received power at the cell site is $g_{jm}p_{jm}$. Assume that the received power from all devices in any cell is common and given by $P_j$, for cell j, i.e., $$P_j \triangleq g_{jm}p_{jm} \; \forall \; m \in \text{cell } j. \tag{1}$$

It is advantageous to work with the quantities $\{P_j\}$ since they are fewer than $\{p_{jm}\}$, leading to a simpler analytic treatment. However, it should be straightforward to recover information on $p_{jm}$ from $P_j$ via (1).

Let $X_{jm}$ be the activity indicator for device m in cell j, i.e., $X_{jm}\in\{0,1\}$ and $X_{jm}=1$ if and only if the device is active (i.e. transmitting information) at a point in time. Let the received power at cell site j due to an active device m in cell k ($k\neq j$) be $g_{jm}p_{km}$. Let $I_{jk}$ denote the received power at cell j due to all devices in cell k($k\neq j$), i.e., $$I_{jk} = \sum_{m \in \text{cell } k} g_{jm}p_{km}X_{km} = \sum_{m \in \text{cell } k} \frac{g_{jm}}{g_{km}} X_{km}(g_{km}p_{km}) = P_k \sum_{m \in \text{cell } k} \frac{g_{jm}}{g_{km}} X_{km}. \tag{2}$$

Let $$M_{jk} \triangleq \sum_{m \in \text{cell } k} \frac{g_{jm}}{g_{km}} X_{km} \; (1 \leq j \leq J, 1 \leq k \leq J). \tag{3}$$

Then, for any active device m in cell j, $X_{jm}=1$ and the interference to its transmission is, using (1), $$I_j = P_j \sum_{m' \in \text{cell } j-(m)} X_{jm'} + \sum_{k:k\neq j} I_{jk} + \eta_j. \tag{4}$$

where $\eta_j$ ($1\leq j\leq J$) is the local receiver noise power at cell j. From (2), (3) and (4), $$I_j = \sum_{k=1}^{J} P_k M_{jk} - P_j + \eta_j \; (1 \leq j \leq J). \tag{5}$$

The quality of service requirement, in terms of the carrier-to-interference ratio, is $$P_j/I_j \geq \alpha(1\leq j\leq J) \tag{6}$$

where $\alpha$ is a prespecified, typically small number. It will be slightly more convenient to write (6) as $$P_j \geq \overline{\alpha}\tilde{I}_j(1\geq j\geq J). \tag{7}$$

where $\overline{\alpha}=\alpha/(1+\alpha)$, and $$\tilde{I}_j \triangleq \sum_{k=1}^{J} P_k M_{jk} + \eta_j \; (1 \leq j \leq J). \tag{8}$$

Typically $\alpha$ is small and $\overline{\alpha}\approx\alpha$.

Now consider the stochastic traffic model of a device transmitting information in bursts to be on-off, i.e., in cell j the device is on or active with probability $w_j$:

$$Pr[X_{jm}=1]=w_j, \; Pr[X_{jm}=0]=1-w_j, \; \forall \; m \in \text{cell } j. \tag{9}$$

The quality of service requirement has to be probabilistic, with probability of compliance at best less than 1. Let the requirement be $$\pi_j \geq L_j (1 \leq j \leq J). \tag{10}$$

where $$\pi_j \overset{\Delta}{=} Pr[P_j \geq \tilde{\alpha}\tilde{I}_j] \quad (1 \leq j \leq J). \tag{11}$$

and $\{L_j\}$ are given parameters.
From (9), $$E(X_{km}) = w_k, \text{ var}(X_{km}) = w_k(1-w_k), \forall m \in \text{cell } k. \tag{12}$$

Hence, from (3), $$E(M_{jk}) = \sum_{m \in \text{cell } k} \frac{g_{jm}}{g_{km}} w_k = K_k G_{jk} w_k, \tag{13}$$

where $K_k$ is the number of devices in cell k, and $$G_{jk} = \frac{1}{K_k} \sum_{m \in \text{cell } k} \frac{g_{jm}}{g_{km}}. \tag{14}$$

Note, in particular, that $G_{jj} = 1$. From (3) and (12), we obtain $$\text{var}(M_{jk}) = \sum_{m \in \text{cell } k} \left(\frac{g_{jm}}{g_{km}}\right)^2 w_k(1-w_k) = K_k H_{jk}^2 w_k(1-w_k), \tag{15}$$

where $$H_{jk}^2 = \frac{1}{K_k} \sum_{m \in \text{cell } k} \left(\frac{g_{jm}}{g_{km}}\right)^2. \tag{16}$$

Assume that $g_{jm}/g_{km}$ are uniformly bounded for $m \in$ cell k. Since $X_{km} \in (0,1)$, it follows that the random variables $g_{jm}X_{km}/g_{km}$ are uniformly bounded for $m \in$ cell k. Hence, from the Lindeberg theorem, see, e.g., W. Feller, *An Introduction to Probability Theory and Its Applications,* Vol. 1, page 254, Wiley, 1968, the central limit theorem holds for $M_{jk}$, as $K_k \to \infty$. Hence $$M_{jk} = K_k G_{jk} w_k + H_{jk} \sqrt{K_k w_k(1-w_k)} Z_{jk}, \tag{17}$$

where $Z_{jk}$ is asymptotically normally distributed, with zero mean and unit variance, as $K_k \to \infty$. note that $Z_{jk}(1 \leq k \leq J)$ are independent random variables.

It is advantageous to introduce a natural scaling, which allows order of magnitude estimates to be made and meaningful and efficient approximations to be developed by dropping negligibly small terms. Inherent to wideband systems in which the bandwidth is shared by a large number of users is the following scaling:

$$\alpha = \frac{a}{K}, \quad K_j = \gamma_j K \quad (1 \leq j \leq J) \tag{18}$$

where $\alpha = O(1)$ and $\gamma_j = O(1)$ as $K \to \infty$. A natural choice for the large parameter K is the sum of all devices in the network, i.e., $$K = \sum_{j=1}^{J} K_j.$$

Let $$P_j = \frac{1}{K}\left(\hat{P}_j + \frac{1}{\sqrt{K}} Q_j\right) (1 \leq j \leq J) \tag{19}$$

where $\hat{P}_j$ and $Q_j$ are O(1). The orders of magnitudes of the first order (dominant) and second order terms in the expansion of $P_j$ are dictated by consistency, as will be seen. The implications of (18) and (19) on the terms $P_j$ and $\overline{\alpha}\overline{I}_j$ appearing in the quality of service specifications, (7), (10) and (11) can now be determined. By substituting (17), (18) and (19) in the expression for $\tilde{I}_j$ in (8), it may be verified that $$\tilde{\alpha}\tilde{I}_j = \frac{a}{K}\left[\sum_k \left[G_{jk}\gamma_k w_k \hat{P}_k + \eta_j\right]\right] + \tag{20}$$

$$\frac{a}{K^{3/2}} \sum_k \left[G_{jk}\gamma_k w_k Q_k + H_{jk}\sqrt{\gamma_k w_k(1-w_k)} Z_{jk}\hat{P}_k\right] + O(1/K^2).$$

To achieve $P_j \geq \overline{\alpha}\overline{I}_j$ ($1 \leq j \leq J$), compare coefficients of, first, $1/K$ and, second, $1/K^{3/2}$ and obtain the systems of inequalities given below in (21) and (22). These constitute sufficient conditions to give $P_j \geq \overline{\alpha}\overline{I}_j$, to within $O(1/K^2)$.

$$\hat{P}_j - a\sum_k G_{jk}\gamma_k w_k \hat{P}_k \geq a\eta_j (1 \leq j \leq J) \tag{21}$$

$$Q_j - a\sum_k G_{jk}\gamma_k w_k Q_k \geq Y_j (1 \leq j \leq J) \tag{22}$$

where $$Y_j \overset{\Delta}{=} a\sum_k H_{jk}\sqrt{\gamma_k w_k(1-w_k)} \hat{P}_k Z_{jk} (1 \leq j \leq J). \tag{23}$$

Equation (21) is a system of relations free of random variables, which is in contrast to (22). First treat (21) before returning to (22).

In matrix form (21) is $$[I - \alpha F]\hat{P} \geq \alpha\eta, \tag{24}$$

where $$\alpha F_{jk} \overset{\Delta}{=} aG_{jk}\gamma_k w_k = \alpha G_{jk} K_k w_k, \tag{25}$$

which will be recognized to be mean values of dominant terms in the interference. Also, (24) is similar in algebraic structure to relations for power levels necessary to combat co-channel interference in narrowband systems, see for instance, Foschini supra. Assume that F is an irreducible matrix and since it is also nonnegative, it has an eigenvalue of maximum modulus, called the Perron-Frobenius eigenvalue, which is real, positive and simple. Denote this eigenvalue by $r_F$. Recall the following result quoted in D. Mitra, *An Asynchronous Distributed Algorithm for Power Control in Cellular Radio Systems,* Fourth Winlab Workshop, pp. 249–257, 1993: the following statements are equivalent:

(i) $\alpha r_F < 1$.

(ii) A solution (24) with $\hat{P} \geq 0$ exists.

(iii) $[I-\alpha F]u - 1$ exists and is element-wise positive (26)

If (26) holds than a particular solution to (24) is $$\hat{P}^* = \alpha[I-\alpha F]^{-1}\eta. \tag{27}$$

This solution is Pareto optimal since any other solution to (24) will have components which are at least as large and at least one component which is larger. Henceforth, assume that (26), which is to be interpreted as a mean-value capacity constraint, holds.

Now turn to (22) and (23). Note that $Z_{jk}$ ($1 \leq k \leq J$) are independent and asymptotically normally distributed, with zero mean and unit variance. Hence, $Y_j$ is asymptotically normally distributed, with zero mean and variance $\alpha^2 \sigma_j^2$ where $$\sigma_j^2 \triangleq \sum_k H_{jk}^2 \gamma_k w_k (1 - w_k) \hat{P}_k^2 \quad (1 \leq j \leq J). \tag{28}$$

To satisfy the quality of service requirement in (10) and (11), pick $\hat{P}$ as in (27) and Q such that $$Pr\left[Q_j - a\sum_k G_{jk}\gamma_k w_k Q_k \geq Y_j\right] \geq 1 - L_j (1 \leq j \leq J). \tag{29}$$

The latter condition is equivalent to the deterministic condition, $$Q_j - a\sum_k G_{jk}\gamma_k w_k Q_k \geq a v_j \sigma_j \quad (1 \leq j \leq J) \tag{30}$$

where $\{v_j\}$ is defined as follows:

$$1 - L_j = \frac{1}{\sqrt{2\pi}} \int_{-\infty}^{v_j} e^{-y^2/2} dy \quad (1 \leq j \leq J). \tag{31}$$

That is, $v_j$ is the multiple of the standard deviation of the asymptotic random variable $Y_j$, which indicates how large the left-hand quantity in (30) has to be for the probabilistic requirement in (29) to be satisfied. In matrix form the system of inequalities in (30) is $$[I-\alpha F]Q \leq \alpha u \tag{32}$$

where $u_j \triangleq v_j \sigma_j$ and $u = \{u_j\}$. The Pareto optimal solution is $$Q^* = \alpha[I-\alpha F]^{-1}u. \tag{33}$$

Note that $Q^* > 0$.

Next, lift the veil of asymptotics and give relations without reference to the scaling in (18) and (19). Let $$A \triangleq \frac{1}{K}\hat{P}^* \text{ and } B = \frac{1}{K^{3/2}}Q^*, \tag{34}$$

so that, from (19), $$P^* = A + B. \tag{35}$$

By multiplying (27) and (33) by $1/K$ and $1/K^{3/2}$, respectively, relations for A and B are obtained:

$$[I-\alpha F]A = \alpha\eta, \tag{36}$$

and $$[I-\alpha F]B = \alpha U(A) \tag{37}$$

where $$U_j(A) \triangleq v_j V_j^{1/2}(A) \text{ and } V_j(A) = \sum_k H_{jk}^2 K_k w_k (1 - w_k) A_k^2. \tag{38}$$

Keep in mind that in the decomposition (35), $B \ll A$. Finally, from (35), (36) and (37)

$$[I-\alpha F]P^* = \alpha[\eta + U(A)]. \tag{39}$$

In view of the above observations, $A \approx A + B = P^*$, hence $$[I-\alpha F]P^* = \alpha[\eta + U(P^*)]. \tag{40}$$

Note that $U(P^*)$ is the term which represents the combined effect of the probabilistic quality of service requirement, and the variance of the interference at the cell sites, which, importantly, depends on the power at all cell sites.

Next, the inventive method for power control is presented based on (40). Write (40) in the form $$P^* = \alpha[F\ P^* + \eta + U(P^*)]. \tag{41}$$

In view of (25) and (38), introduce the measured quantities at cell j, $$\bar{I}_j(n) = \sum_k G_{jk} K_k w_k P_k(n) + \eta_j, \quad (1 \leq j \leq J). \tag{42}$$

and $$\bar{V}_j(n) = \sum_k H_{jk}^2 K_k w_k (1 - w_k) P_k^2(n). \tag{43}$$

These are the measured values of the mean and variance of the total interference at cell j. The distributed method for power control is $$P_j(n+1) = \alpha\left[\bar{I}_j(n) + v_j\sqrt{\bar{V}(n)}\right], \quad (n = 0, 1, \ldots), \tag{44}$$

where $\{v_j\}$, defined in (31), are fixed, known quantities. The adaptation of power is thus driven by local measurement of the mean and variance of the interference.

In vector form, the method is $$P(n+1) = \alpha[F\ P(n) + \eta + U(P(n))]. \tag{45}$$

Hence, from (41), $$P(n+1) - P^* = \alpha\{F[P(n) - P^*] + U(P(n)) - U(P^*)\}. \tag{46}$$

Under the assumption that (26) holds, $$\|F[P(n) - P^*]\| \leq r_F\|P(n) - P^*\| \tag{47}$$

where the norm is defined in terms of the element-wise positive Perron-Frobenius eigenvector w, i.e., $$Fw = r_F w,\ w > 0. \tag{48}$$

Specifically, $$\|x\| = \max_{1 \leq j \leq J} |x_j| / w_j. \quad (49)$$

By standard manipulation of norms, it may be shown that $$\|U(P(n)) - U(P^*)\| \leq c \|P(n) - P^*\|. \quad (50)$$

where c is a constant. It follows, from (46), (47) and (50), that $$\|P(n+1) - P^*\| \leq \alpha(r_F 30\ c) \|P(n) - P^*\|. \quad (51)$$

Assume that $\alpha(r_F + c) < 1$. Then, by induction, $$\|P(n) - P^*\| \leq [\alpha(r_F + c)]^n \|P(0) - P^*\|, \quad (52)$$

so that the convergence of P(n) to P* is geometric. Note that in our asymptotic analysis, with the scalings in (18) and the definitions in (38), $\alpha c = O(1/\sqrt{K})$, and hence the condition for geometric convergence is only slightly more stringent than the condition $\alpha r_F < 1$, corresponding to the substitution of mean activity values.

The method and apparatus disclosed herein has been described without reference to specific hardware or software. Instead, the method and apparatus have been described in such a way that those skilled in the art can readily adapt such hardware or software as may be available or preferable. While the above teaching of the present invention has been in terms of power control in a cellular communications network using spread spectrum access techniques, those skilled in the art will recognize the applicability of these teachings to other specific contexts. For example, the above teachings may be applied to wireless networks that are not cellular based. Also, the above teachings have been presented in the context of power control from a communications device to a based station in a cellular network. However, the above teachings are likewise applicable to signals sent from a base station to a communications device in a cellular network.

We claim:

1. A method of determining a desired received power level at a base unit so that each signal of interest that arrives at the base unit is characterized by a power level which permits the signal to satisfy quality of service requirements, comprising the steps of:

receiving an interference signal at the base unit, determining, over a time interval, a set of parameters characterizing said interference signal received at said base unit, said set of parameters comprising an interference average and a statistic which is a second or higher order statistic, and determining, based on an increasing function of the interference average and the product of a positive coefficient times the statistic, a desired received power level at said base unit for signals of interest transmitted from a communications device to said base unit.

2. The method of claim 1 further comprising the step of:

transmitting a signal to said communications device from said base unit, said signal comprising information about said desired power level.

3. The method of claim 2 wherein said signal transmitted to said communications device is transmitted from said base unit at a transmit power level.

4. The method of claim 2 wherein said signal transmitted to said communications device comprises information about a transmit power level at which said signal is transmitted.

5. The method of claim 3 or 4 further comprising the step of:

measuring, at said communications device, the received power level of said signal transmitted from said base unit at said transmit power level, and determining a path gain between said communications device and said base unit as a function of said transmit power level and of said measured received power level of said signal.

6. The method of claim 5 further comprising the step of:

transmitting a signal at a power level from said communications device to said base unit, said power level of said transmitted signal being a function of said determined path gain and said desired power level.

7. The method of claim 1 wherein said set of parameters comprises a variance of said interference signal received at said base unit.

8. The method of claim 7 wherein said base unit is the $j^{th}$ base unit in a plurality of base units and wherein said desired power signal, $P_j$, for the $j^{th}$ base unit at a time (n+1) is determined according to:

$$P_j(n+1) = \alpha \left[ \bar{I}_j(n) + v_j \sqrt{\bar{V}_j(n)} \right] \quad (n = 0, 1, 2, \ldots)$$

where $\bar{I}_j(n)$ is the average of said interference signal at said base unit j at time n, $\bar{V}_j(n)$ is the variance of said interference signal at said $j^{th}$ base unit at time n, $\alpha$ is a parameter related to a quality of service requirement, and $v_j$ is a function of a probability measure that said quality of service requirement is met.

9. The method of claim 1 wherein said base unit is a base station in a cellular communications system.

10. The method of claim 9 wherein said cellular communications system is a spread spectrum multiple access system.

11. The method of claim 1 wherein said interference signal comprises signals, received at said base unit, transmitted by communications devices other than said communications device.

12. A method of operating a network including regulating a power level of a signal transmitted from a communications device to a base unit, said desired received power level being based on an increasing function of an interference average of an interference signal received at said base unit and the product of a positive coefficient times a statistic, the statistic comprising a second or higher order statistic of the interference signal, determining a signal path gain between said communications device and said base unit, and regulating said power level of said signal transmitted from said communications device to said base unit as a function of said signal path gain and said desired received power level.

13. The method of claim 12 wherein the step of determining a signal path gain comprises the steps of:

receiving, at said communications device, a pilot signal transmitted at a transmit power level from said base unit, and measuring, at said communications device, a received power level of said pilot signal, and determining said signal path gain based on said measured received power level of said pilot signal and on said transmit power level.

14. The method of claim 12 wherein the step of determining a signal path gain comprises the steps of:

receiving, at said communications device, a pilot signal transmitted from said base unit, said pilot signal comprising information about a transmit power level at which said pilot signal was transmitted from said base unit, measuring, at said communications device, a received power level of said pilot signal, and determining said signal path gain based on said transmit power level and on said measured received power level of said pilot signal.

15. The method of claim 12 wherein said base unit is a base station in a cellular communications system.

16. The method of claim 12 wherein said interference signal comprises signals, received at said base unit, transmitted by communications devices other than said communications device.

17. The method of claim 12 wherein said set of statistics comprises a variance of said interference signal received at said base unit.

18. The method of claim 17 wherein said base unit is the $j^{th}$ base unit in a plurality of base units and wherein said desired power signal, $P_j$, for the $j^{th}$ base unit at a time (n+1) is determined according to:

$$P_j(n+1) = \alpha\left[\bar{I}_j(n) + v_j\sqrt{\bar{V}_j(n)}\right] \quad (n = 0, 1, 2, \ldots)$$

where $\bar{I}_j(n)$ is the average of said interference signal at said base unit j at time n, $\bar{V}_j(n)$ is the variance of said interference signal at said $j^{th}$ base unit at time n, $\alpha$ is a parameter related to a quality of service requirement, and $v_j$ is a function of a probability measure that said quality of service requirement is met.

19. In a system comprising a set of base stations, wherein each base station in said set of base stations communicates with an associated set of one or more communications devices, a method of operating a system by regulating a power level of a signal transmitted from a particular communications device in the set of communications devices associated with a given base station so that each signal of interest that arrives at a base unit is characterized by a power level which permits the signal to satisfy quality of service requirements, the method comprising the steps of:

determining a desired received power level of a signal transmitted from said particular communications device to said given base station, said desired received power level being based on an increasing function of an interference average and the product of a positive coefficient times a statistic characterizing an interference signal at said given base station, the statistic comprising a second or higher order statistic, determining a signal path gain between said particular communications device and said given base station, and.

regulating said power level of said signal transmitted from said particular communications device as a function of said signal path gain and said desired received power level.

20. The method of claim 19 wherein the step of determining a signal path gain comprises the steps of:

receiving, at said particular communications device, a pilot signal transmitted at a transmit power level from said given base station, measuring, at said particular communications device, a received power level of said pilot signal, and determining said signal path gain based on said measured received power level of said pilot signal and on said transmit power level.

21. The method of claim 19 wherein the step of determining a signal path gain comprises the steps of:

receiving, at said particular communications device, a pilot signal transmitted from said given base station, said pilot signal comprising information about a transmit power level at which said pilot signal was transmitted, measuring, at said particular communications device, a received power level of said pilot signal, and determining said signal path gain based on said measured received power level of said pilot signal and on said transmit power level.

22. The method of claim 19 wherein said interference signal comprises signals, received at said given base station, transmitted by communications devices other than said particular communications device.

23. The method of claim 19 wherein said set of statistics comprises a variance of said interference signal received at said given base station.

24. The method of claim 23 wherein said given base unit is the $j^{th}$ base station in said set of base stations and wherein said desired power signal, $P_j$, for the $j^{th}$ base station at a time (n+1) is determined according to:

$$P_j(n+1) = \alpha\left[\bar{I}_j(n) + v_j\sqrt{\bar{V}_j(n)}\right] \quad (n = 0, 1, 2, \ldots)$$

where $\bar{I}_j(n)$ is the average of said interference signal at said $j^{th}$ base station at time n, $\bar{V}_j(n)$ is the variance of said interference signal at said $j^{th}$ base station at time n, $\alpha$ is a parameter related to a quality of service requirement, and $v_j$ is a function of a probability measure that said quality of service requirement is met.

25. A method of transmitting signals in a communications system at a desired received power level at a base unit so that each signal of interest that arrives at a base unit is characterized by a power level which permits the signal to satisfy quality of service requirements, comprising the steps of:

measuring, at a communications device, this power level of a pilot signal, said pilot signal having been transmitted from a base unit, said pilot signal comprising information about a desired power level of signals received at said base unit, wherein said desired power level is based on an increasing function of an interference average of an interference signal received at said base unit and the product of a positive coefficient times a statistic, where said statistic is a second or higher order statistic characterizing said interference signal, determining a path gain between said base unit and said communications device, and transmitting a signal at a transmitted power level from said communications device, wherein said transmitted power level is a function of said path gain and said desired power level.

26. The method of claim 25 wherein said pilot signal is transmitted from said base unit at a transmit power level.

27. The method of claim 25 wherein said pilot signal comprises information about a transmit power level at which said pilot signal was transmitted.

28. The method of claim 26 or 27 wherein the determination of said path gain is based on said transmit power level and said measured power level of said received pilot signal.

29. The method of claim 25 wherein said second order or higher statistics comprise a variance of said interference signal received at said base unit.

30. The method of claim 25 wherein said base unit is the $j^{th}$ base unit in a plurality of base units and wherein said desired power signal, $P_j$, for the $j^{th}$ base unit at a time (n+1) is determined according to:

$$P_j(n+1) = \alpha\left[\bar{I}_j(n) + v_j\sqrt{\bar{V}_j(n)}\right] \quad (n = 0, 1, 2, \ldots)$$

where $\bar{I}_j(n)$ is the average of said interference signal at said base unit j at time n, $\bar{V}_j(n)$ is the variance of said interference signal at said $j^{th}$ base unit at time n, $\alpha$ is a parameter related to a quality of service requirement, and $v_j$ is a function of a probability measure that said quality of service requirement is met.

31. The method of claim 25 wherein said base unit is a base station in a cellular communications system.

32. The method of claim 31 wherein said cellular communications system is a spread spectrum multiple access system.

33. The method of claim 25 wherein said interference signal comprises signals, received at said base unit, transmitted by communications devices other than said communications device.

34. An apparatus for transmitting signals in a communications system at a desired received power level at a base unit so that each signal of interest that arrives at a base unit is characterized by a power level which permits the signal to satisfy quality of service requirements comprising;
    means for receiving an interference signal at a base unit,
    means for determining, over a time interval, a set of parameters characterizing said interference signal received at said base unit, said set of parameters comprising an interference average and a statistic which is a second or higher order statistic, said means for determining connected to said means for receiving to determine said set of parameters, and
    means for determining, based on an increasing function of the interference average and the product of a positive coefficient times the statistic, a desired power level at said base unit for signals transmitted from a communications device to said base unit.

35. The apparatus of claim 34 further comprising:
    means for transmitting a signal to said communications device from said base unit, said signal comprising information about said desired power level.

36. The apparatus of claim 35 wherein said signal transmitted to said communications device is transmitted from said base unit at a transmit power level.

37. The apparatus of claim 35 wherein said signal transmitted to said communications device comprises information about a transmit power level at which said signal is transmitted.

38. The apparatus of claim 34 wherein said set of parameters comprises a variance of said interference signal received at said base unit.

39. The apparatus of claim 34 wherein said base unit is the $j^{th}$ base unit in a plurality of base units and wherein said desired power signal, $P_j$, for the $j^{th}$ base unit at a time (n+1) is determined according to:

$$P_j(n+1) = \alpha\left[\bar{I}_j(n) + v_j\sqrt{\bar{V}_j(n)}\right] \quad (n = 0, 1, 2, \ldots)$$

where $\bar{I}_j(n)$ is the average of said interference signal at said base unit j at time n, $\bar{V}_j(n)$ is the variance of said interference signal at said $j^{th}$ base unit at time n, $\alpha$ is a parameter related to a quality of service requirement, and $v_j$ is a function of a probability measure that said quality of service requirement is met.

40. The apparatus of claim 34 wherein said base unit is a base station in a cellular communications system.

41. The apparatus of claim 40 wherein said cellular communications system is a spread spectrum multiple access system.

42. An apparatus for operating a network including means for regulating a power level of a signal transmitted from a communications device to a base unit so that each signal of interest that arrives at a base unit is characterized by a power level which permits the signal to satisfy quality of service requirements, the apparatus comprising:
    means for determining a desired received power level of said signal transmitted from communications device to said base unit, said desired received power level being based on an increasing function of an interference signal received at said base unit and the product of a positive coefficient times a statistic, the statistic comprising a second or higher order statistic characterizing the interference signal,
    means for determining a signal path gain between said communications device and said base unit, and
    means for regulating said power level of said signal transmitted from said communications device to said base unit as a function of said signal path gain and of said desired received power level.

43. The apparatus of claim 42 wherein the means for determining a signal path gain comprises:
    means for receiving, at said communications device, a pilot signal transmitted at a transmit power level from said base unit, and
    means for measuring, at said communications device, a received power level of said pilot signal, and
    means for determining said signal path gain based on said measured received power level of said pilot signal and on said transmit power level.

44. The apparatus of claim 42 wherein the means for determining a signal path gain comprises:
    means for receiving, at said communications device, a pilot signal transmitted from said base unit, said pilot signal comprising information about a transmit power level at which said pilot signal was transmitted from said base unit,
    means for measuring, at said communications device, a received power level of said pilot signal, and p1 means for determining said signal path gain based on said transmit power level and on said measured received power level of said pilot signal.

45. The apparatus of claim 42 wherein said base unit is a base station in a cellular communications system.

46. The apparatus of claim 42 wherein said set of statistics comprises a variance of said interference signal received at said base unit.

47. The apparatus of claim 46 wherein said base unit is the $j^{th}$ base unit in a plurality of base units and wherein said desired power signal, $P_j$, for the $j^{th}$ base unit at a time (n+1) is determined according to:

$$P_j(n+1) = \alpha\left[\bar{I}_j(n) + v_j\sqrt{\bar{V}_j(n)}\right] \quad (n = 0, 1, 2, \ldots)$$

where $\bar{I}_j(n)$ is the average of said interference signal at said base unit j at time n, $\bar{V}_j(n)$ is the variance of said interference signal at said $j^{th}$ base unit at time n, $\alpha$ is a parameter related to a quality of service requirement, and $v_j$ is a function of a probability measure that said quality of service requirement is met.

48. The apparatus of claim 42 further comprising means for transmitting said signal transmitted from said communications device to said base unit.

49. In a system comprising a set of base stations, wherein each base station in said set of base stations communicates with an associated set of one or more communications devices, an apparatus for operating a system by regulating a power level of a signal transmitted from a particular communications device in the set of communications devices associated with a given base station so that each signal of interest that arrives at a base unit is characterized by a power level which permits the signal to satisfy quality of service requirements, the apparatus comprising:

means for determining a desired received power level of a signal transmitted from said particular communications device to said given base station, said desired received power level being based on an increasing function of an interference average of an interference signal at said given base station and the product of a positive coefficient times a statistic, the comprising a second or higher order statistic characterizing the interference signal, means for determining a signal path gain between said particular communications device and said given base station, and means for regulating said power level of said signal transmitted from said particular communications device as a function of said signal path gain and said desired received power level.

50. The apparatus of claim 49 wherein the means for determining a signal path gain comprises:

means for receiving, at said particular communications device, a pilot signal transmitted at a transmit power level from said given base station, means for measuring, at said particular communications device, a received power level of said pilot signal, and means for determining said signal path gain based on said measured received power level of said pilot signal and on said transmit power level.

51. The apparatus of claim 49 wherein the means for determining a signal path gain comprises the steps of:

means for receiving, at said particular communications device, a pilot signal transmitted from said given base station, said pilot signal comprising information about a transmit power level at which said pilot signal was transmitted, means for measuring, at said particular communications device, a received power level of said pilot signal, and means for determining said signal path gain based on said measured received power level of said pilot signal and on said transmit power level.

52. The apparatus of claim 49 wherein said given base unit is the $j^{th}$ base station in said set of base stations and wherein said desired power signal, $P_j$, for the $j^{th}$ base station at a time (n+1) is determined according to:

$$P_j(n+1) = \alpha\left[\bar{I}_j(n) + v_j\sqrt{\bar{V}_j(n)}\right] \quad (n = 0, 1, 2, \ldots)$$

where $\bar{I}_j(n)$ is the average of said interference signal at said $j^{th}$ base station at time n, $\bar{V}_j(n)$ is the variance of said interference signal at said $j^{th}$ base station at time n, $\alpha$ is a parameter related to a quality of service requirement, and $v_j$ is a function of a probability measure that said quality of service requirement is met.

53. The apparatus of claim 49 further comprising means for transmitting said signal transmitted from said particular communications device to said given base station.

54. A method for regulating the power level of signals to be sent in the presence of interference, from a sending station to a receiving station of a wireless communication network, comprising:

a) measuring interference at the receiving station;

b) providing an average of the measured interference;

c) providing a statistic of the measured interference, wherein the statistic is of second or higher order;

d) computing a target level of received signal power, wherein the computed level is an increasing function of:
 (i) the interference average; and
 (ii) the product of a positive coefficient times the statistic; and e) communicating the target level to the sending station, for the sending station to set a transmission power level accordingly.

55. A method for regulating the power level of signals to be sent, in the presence of interference, from a sending station to a receiving station of a wireless communication network, comprising:

a) measuring interference at the receiving station;

b) providing an average of the measured interference;

c) providing a statistic of the measured interference, wherein the statistic is of a second or higher order;

d) computing a target level of received signal power, wherein the computed level is an increasing function of a weighted combination of the average and the second or higher order statistic of the measured interference; and e) communicating the target level to the sending station, for the sending station to set a transmission power level accordingly.

* * * * *